(12) United States Patent
Miura et al.

(10) Patent No.: US 9,057,625 B2
(45) Date of Patent: Jun. 16, 2015

(54) NAVIGATION SYSTEM, NAVIGATION METHOD, AND COMPUTER-READABLE STORAGE MEDIUM

(75) Inventors: Naoki Miura, Toyokawa (JP); Junichi Nonomura, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 55 days.

(21) Appl. No.: 13/523,117

(22) Filed: Jun. 14, 2012

(65) Prior Publication Data

US 2013/0018583 A1    Jan. 17, 2013

(30) Foreign Application Priority Data

Jul. 5, 2011 (JP) ................................ 2011-148878

(51) Int. Cl.
| | |
|---|---|
| G01C 21/30 | (2006.01) |
| G01C 21/00 | (2006.01) |
| B60R 1/00 | (2006.01) |
| G01C 21/36 | (2006.01) |

(52) U.S. Cl.
CPC ..... *G01C 21/3697* (2013.01); *B60K 2350/1092* (2013.01)

(58) Field of Classification Search
CPC ........... G01C 21/3469; G01C 21/3697; G01C 21/3617; G01C 23/00; B60L 3/12; B60L 2260/52
See application file for complete search history.

(56) References Cited

U.S. PATENT DOCUMENTS

| | | | | |
|---|---|---|---|---|
| 5,552,989 | A * | 9/1996 | Bertrand ...................... | 701/516 |
| 6,314,363 | B1 * | 11/2001 | Pilley et al. .................. | 701/120 |
| 2002/0056314 | A1 | 5/2002 | Kumagai et al. | |
| 2002/0167519 | A1 * | 11/2002 | Olsen ........................... | 345/440 |
| 2003/0006914 | A1 | 1/2003 | Todoriki et al. | |
| 2006/0271284 | A1 | 11/2006 | Watanabe et al. | |
| 2007/0005237 | A1 * | 1/2007 | Needham et al. ............. | 701/202 |
| 2007/0078599 | A1 | 4/2007 | Yoshioka et al. | |
| 2008/0294339 | A1 | 11/2008 | Tauchi et al. | |
| 2010/0058225 | A1 * | 3/2010 | Lin et al. ...................... | 715/785 |
| 2010/0087977 | A1 * | 4/2010 | Bonne ........................... | 701/22 |

(Continued)

FOREIGN PATENT DOCUMENTS

| | | | |
|---|---|---|---|
| DE | 10 2006 054 326 A1 | 5/2008 | |
| DE | 10 2007 007 955 A1 | 8/2008 | |

(Continued)

OTHER PUBLICATIONS

Oct. 29, 2013 Office Action issued in U.S. Appl. No. 13/530,917.

(Continued)

*Primary Examiner* — Helal A Algahaim
*Assistant Examiner* — Paul Castro
(74) *Attorney, Agent, or Firm* — Oliff PLC

(57) ABSTRACT

Navigation systems, methods, and programs acquire evaluation information for each unit interval having a predetermined distance, the evaluation information being an index for evaluating a driver's driving operation of a vehicle, and determine based on a first scale of a map displayed on a display unit, a first distance of an evaluation interval for evaluating the driver's driving operation. The systems, methods, and programs evaluate the driver's driving operation in the evaluation interval having the first distance based on the evaluation information for each unit interval included in the evaluation interval, and display the evaluation result at a position corresponding to the evaluation interval on the map displayed on the display unit.

6 Claims, 8 Drawing Sheets

(56) References Cited

U.S. PATENT DOCUMENTS

| | | | |
|---|---|---|---|
| 2011/0288737 A1* | 11/2011 | Carr | 701/99 |
| 2012/0004838 A1* | 1/2012 | Lee et al. | 701/123 |
| 2012/0022904 A1* | 1/2012 | Mason et al. | 705/7.13 |
| 2012/0029803 A1* | 2/2012 | Yasushi et al. | 701/123 |
| 2012/0191334 A1 | 7/2012 | Kashio et al. | |
| 2012/0265433 A1 | 10/2012 | Viola et al. | |
| 2013/0179062 A1 | 7/2013 | Yasushi et al. | |
| 2013/0245945 A1 | 9/2013 | Morita et al. | |

FOREIGN PATENT DOCUMENTS

| | | |
|---|---|---|
| DE | 10 2008 041 255 A1 | 2/2010 |
| EP | 1 973 078 A1 | 9/2008 |
| EP | 2 295 934 A1 | 3/2011 |
| JP | H09184732 A | 7/1997 |
| JP | H10-227648 A | 8/1998 |
| JP | 2003288003 A | 10/2003 |
| JP | 2004-251786 A | 9/2004 |
| JP | 2004286496 A | 10/2004 |
| JP | 2006-030058 A | 2/2006 |
| JP | 2007187681 A | 7/2007 |
| JP | 2008180576 A | 8/2008 |
| JP | 2009-002847 A | 1/2009 |
| JP | 2010-151570 A | 7/2010 |
| JP | A-2010-182108 | 8/2010 |
| JP | 2011033447 A | 2/2011 |
| WO | 2011/030397 A1 | 3/2011 |
| WO | WO 2011/030398 | 3/2011 |

OTHER PUBLICATIONS

European Search Report issued in European Patent Application No. EP 12 17 3213.5 dated Jun. 23, 2014.
European Search Report issued in European Patent Application No. EP 12 17 3221.8 dated Jun. 18, 2014.
European Search Report issued in European Patent Application No. EP 12 17 3234.1 dated Jun. 23, 2014.
Jan. 16, 2015 Office Action issued in U.S. Appl. No. 13/523,276.

* cited by examiner

ECO LAMP

F I G . 7
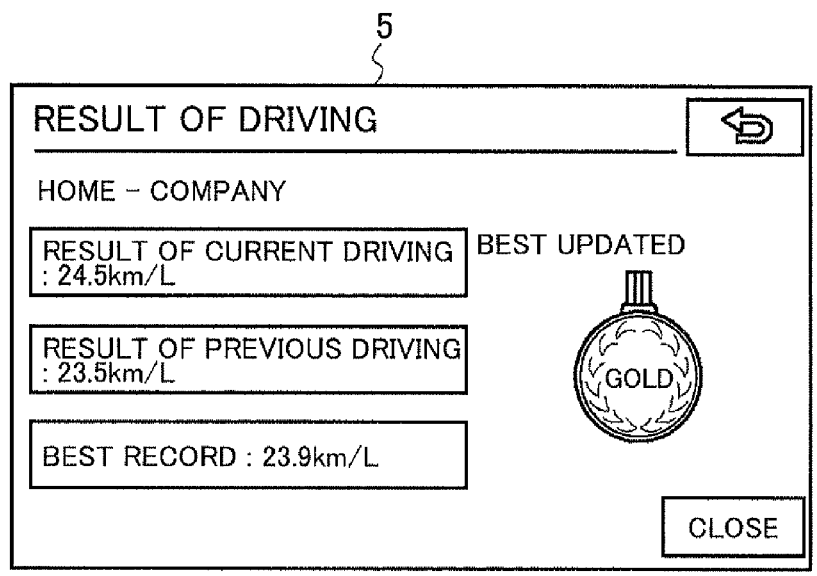

NAVIGATION SYSTEM, NAVIGATION METHOD, AND COMPUTER-READABLE STORAGE MEDIUM

INCORPORATION BY REFERENCE

The disclosure of Japanese Patent Application No. 2011-148878 filed on Jul. 5, 2011 including the specification, drawings and abstract is incorporated herein by reference in its entirety.

BACKGROUND OF THE INVENTION

1. Field of the Invention

The present invention relates to a navigation system, a navigation method, and a computer-readable storage medium.

2. Description of the Related Art

Conventionally, a navigation system is used to guide a vehicle along a travel route. Today, there is an increasing need for fuel-saving driving from the viewpoint of fuel-cost saving and environmental protection and, to satisfy this need, a navigation system is proposed that provides guidance with the aim of fuel-cost reduction in vehicle driving.

As an example of such a system, a portable device and vehicle system is proposed (for example, see Japanese Patent Application Publication No. 2010-182108 (JP-A-2010-182108)). This system serially acquires the vehicle driving status information and the eco-indicator on/off status information during the driving status and stores the acquired information in a storage unit. When a request is received from the user, the system displays the time-series change in driving statuses and the eco-indicator on/off states during the driving statuses, based on the information stored in the storage unit, that is, the information on multiple driving statuses and the information on multiple eco-indicator on/off statuses during the driving statuses.

SUMMARY OF THE INVENTION

The conventional system described above displays only the time-series change in the eco-indicator on/off status. Therefore, when the time-series change in the eco-indicator on/off status is indicated by displaying marks, each indicating the eco indicator on/off status, on the map, the smaller the scale is, that is, the wider the display range of the map is, the smaller the interval between the marks becomes. This results in an overlap of marks, sometimes decreasing user's visibility.

The present invention provides a navigation system, a navigation method, and a computer-readable storage medium for displaying the evaluation result of the driver's driving operation on a map in an easy to view manner.

According to a first aspect of the present invention, there is provided a navigation system including: an evaluation information acquisition unit that acquires evaluation information for each unit interval having a predetermined distance, the evaluation information being an index for evaluating a driver's driving operation of a vehicle; an evaluation unit that determines, based on a first scale of a map displayed on a display unit, a first distance of an evaluation interval for evaluating the driver's driving operation and evaluates the driver's driving operation in the evaluation interval having the first distance based on the evaluation information for each unit interval included in the evaluation interval; and a display control unit that performs control so that an evaluation result by the evaluation unit is displayed at a position corresponding to the evaluation interval on the map displayed on the display unit.

According to a second aspect of the present invention, there is provided a navigation method including: acquiring evaluation information for each unit interval having a predetermined distance, the evaluation information being an index for evaluating a driver's driving operation of a vehicle; determining, based on a first scale of a map displayed on a display unit, a first distance of an evaluation interval for evaluating the driver's driving operation; evaluating the driver's driving operation in the evaluation interval having the first distance based on the evaluation information for each unit interval included in the evaluation interval; and performing control so that an evaluation result of the driver's driving operation is displayed at a position corresponding to the evaluation interval on the map displayed on the display unit.

According to a third aspect of the present invention, there is provided a computer-readable storage medium that stores computer-executable instructions for performing the navigation method in the second aspect of the present invention.

According to the above configurations, the first distance of an evaluation interval, used for evaluating the driver's driving operation, is determined based on the first scale of the map displayed on the display unit. In addition, the driver's driving operation in the evaluation interval having the first distance is evaluated based on the evaluation information for each unit interval included in the evaluation interval. Then, the control is performed so that the evaluation result in the evaluation interval is displayed at the position corresponding to the evaluation interval on the map displayed on the display unit. This configurations therefore allows the evaluation results, which are displayed on the display unit, to be properly spaced to each other according to the scale of the map, thus allowing the evaluation result of the driver's driving operation to be displayed on the map in an easy to view format.

BRIEF DESCRIPTION OF THE DRAWINGS

The features, advantages, and technical and industrial significance of this invention will be described below with reference to the accompanying drawings, in which like numerals denote like elements, and wherein:

FIG. 3A is a diagram showing an example of the meter panel of a gasoline-powered vehicle and FIG. 3B is a diagram showing an example of the meter panel of a hybrid vehicle;

FIG. 7 is a diagram showing an example of the display on which the final evaluation result is displayed.

DETAILED DESCRIPTION OF THE EMBODIMENTS

An embodiment of a navigation system, a navigation method, and a computer-readable storage medium according to the present invention will be described in detail below with reference to the drawings. It should be noted that the present invention is not limited by this embodiment.

Figure 1:
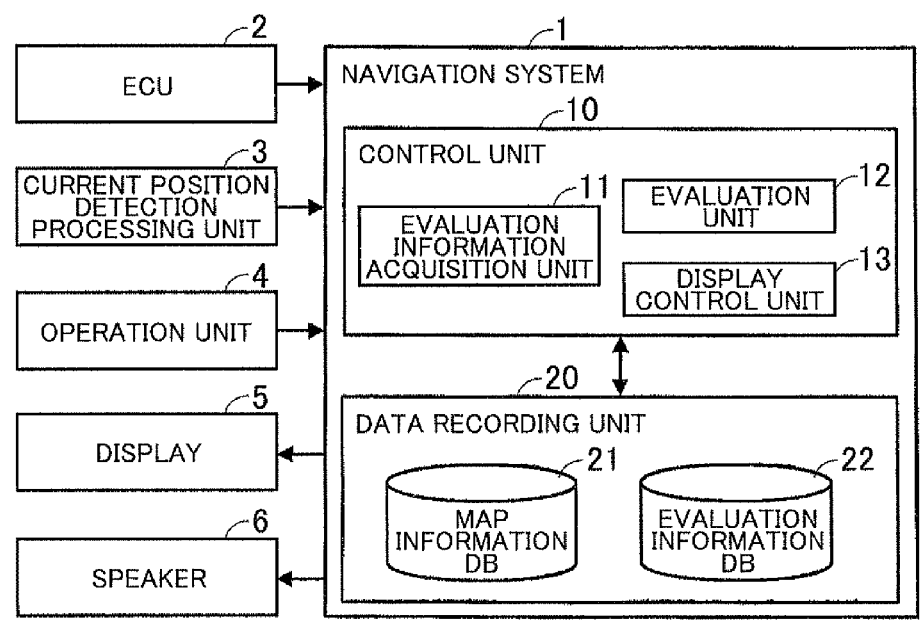
FIG. 1 is a block diagram showing an example of a navigation system in an embodiment.

First, the following describes the configuration of the navigation system. FIG. 1 is a block diagram showing an example of the navigation system in this embodiment. A navigation system 1 is installed, for example, on a vehicle. As shown in FIG. 1, the navigation system 1 is connected to an Electronic Control Unit (ECU) 2, a current position detection processing unit 3, an operation unit 4, a display 5, and a speaker 6.

The ECU 2 monitors the status of the units of the vehicle via various types of sensors to control the units of the vehicle including the power system, such as the engine and motor generator, the transmission, the drive system, and the control system (all not shown) of the vehicle. For example, the ECU 2 controls the transmission by acquiring the vehicle-speed pulse signal, which is proportional to the number of rotations of the axle, from the vehicle speed sensor and controls the fuel injection system (not shown) based on the oxygen concentration in exhaust gas acquired from the O2 sensor. Various types of information, such as the vehicle-speed pulse signal and the fuel injection amount, are input from the ECU 2 to the navigation system 1.

The current position detection processing unit 3 detects the current vehicle position. More specifically, the current position detection processing unit 3 includes at least one of the GPS, geomagnetic sensor, distance sensor, and gyro sensor (all not shown) to detect the current vehicle position (coordinates) and direction using a known method.

The operation unit 4 accepts user's operation input. Any arbitrary configuration may be used as the actual configuration of the operation unit 4. For example, the operation unit 4 may be configured using a touch panel provided in front of the display 5, pushbuttons, a remote operation unit such as a remote control, or a voice recognition unit such as a microphone that accepts voice input.

The display 5 displays various types of information under control of the navigation system 1. Any arbitrary configuration may be used as the actual configuration of the display 5. For example, a flat panel display, such as a known liquid crystal display or organic electro-luminescence display, may be used.

The speaker 6 outputs various types of voice under control of the navigation system 1. Any arbitrary mode of voice may be used as the actual voice output from the speaker 6. Synthetic voice or pre-recorded voice may be the output as necessary.

The navigation system 1 includes a control unit 10 and a data recording unit 20.

The control unit 10 controls the navigation system 1. More specifically, the control unit 10 is a computer configured by a CPU, various programs interpreted by and executed on the CPU, and an internal memory such as a RAM for storing programs and various data. The navigation program in this embodiment is installed into the navigation system 1 via a recording medium or a network to substantially configure the units of the control unit 10. The programs mentioned above include the basic control programs such as the OS and the application programs that are started by the OS for implementing specific functions.

The control unit 10 includes the following three conceptually functional units: evaluation information acquisition unit 11, evaluation unit 12, and display control unit 13. The evaluation information acquisition unit 11 acquires evaluation information, which is an index for evaluating the vehicle driver's driving operation, for each predetermined-distance unit interval. The evaluation unit 12 evaluates the driver's driving operation in each evaluation interval. The display control unit 13 performs control so that the evaluation result by the evaluation unit 12 is displayed at a position corresponding to each evaluation interval on the map displayed on the display 5. The processing performed by the units of the control unit 10 will be described later more in detail.

The data recording unit 20 records therein the programs and various data required for the operation of the navigation system 1. For example, the data recording unit 20 is configured by a magnetic recording medium such as a hard disk (not shown) that is one of external storage devices. Other recording media, including a semiconductor storage medium, such as a flash memory, or an optical recording medium, such as a DVD or a blue-ray disc, may also be used as the data recording unit 20 in place of, or in conjunction with, a hard disk.

The data recording unit 20 includes a map information database 21 (hereinafter a database is abbreviated DB) and an evaluation information DB 22.

The map information DB 21 stores map information. For example, the map information includes the following: link data (link number, connection node number, road coordinates, road type, number of lanes, driving regulation, etc.), node data (node number, coordinates), object data (traffic signal, road sign, guard rail, building, etc.), facility data (facility location, facility type, etc.), geographical feature data, and map display data for displaying a map on the display 5.

The evaluation information DB 22 stores evaluation information that is used as an index for evaluating the vehicle driver's driving operation. The specific contents of the evaluation information and the time at which the evaluation information is stored in the evaluation information DB 22 will be described later.

Next, the following describes the processing that is executed by the navigation system 1 configured as described above. The processing executed by the navigation system 1 is divided roughly into two: evaluation information acquisition processing and display control processing.

Figure 2:
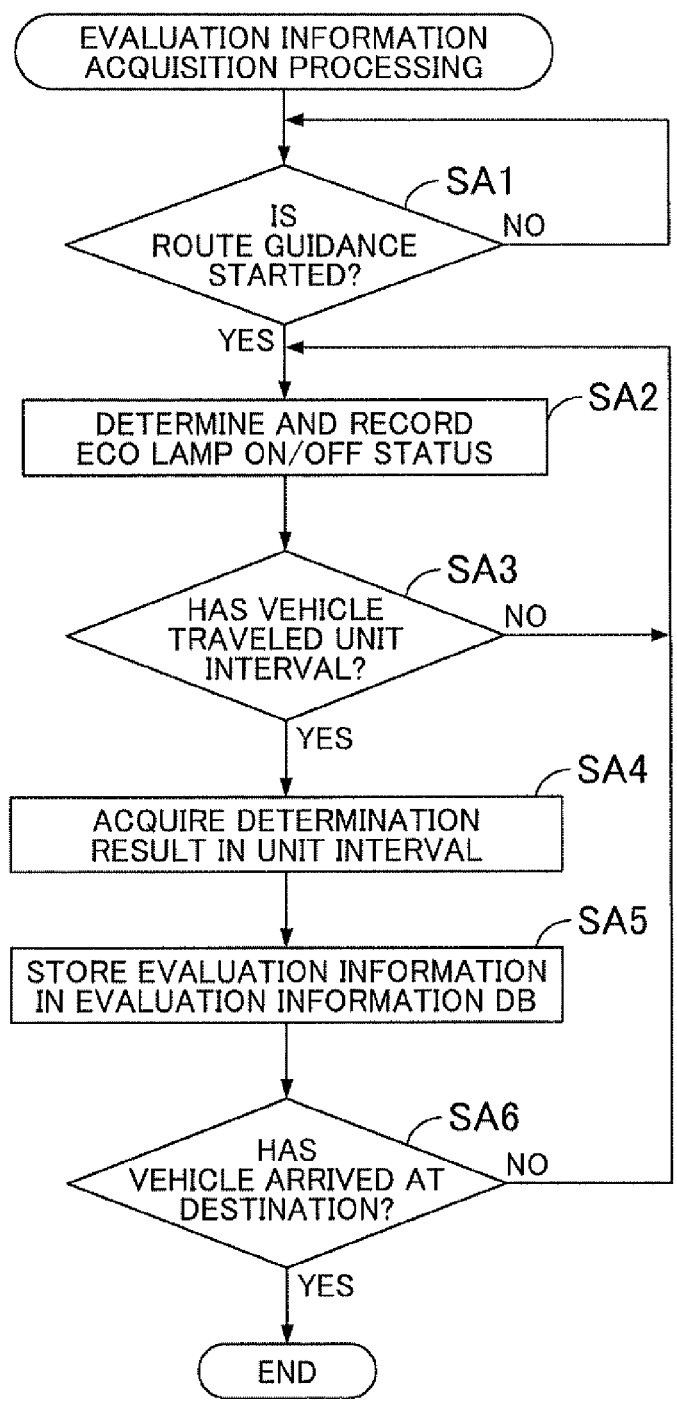
FIG. 2 is a flowchart showing the evaluation information acquisition processing.

First, the following describes the evaluation information acquisition processing. FIG. 2 is a flowchart showing the evaluation information acquisition processing (in the description of the processing below, "step" is abbreviated S). The evaluation information acquisition processing is started, for example, when the navigation system 1 is turned on and the user performs the operation via the operation unit 4 to set the vehicle's travel destination. In this case, the user sets the destination, for example, by performing one of the following operations: the user performs the operation via operation unit 4 to set the final destination, the user re-arranges two or more already-set destinations via the operation unit 4 to set a destination different from the already-set final destination as the new final destination, and the user erases the already-set final destination and sets another destination as the new final destination (the same applies to the display control processing that will be described later).

Immediately after the evaluation information acquisition processing is started, the evaluation information acquisition unit 11 waits until route guidance from the starting point (for example, the current position detected by the current position detection processing unit 3) to the destination is started (No in SA1). A route search method and a route guidance method, which are known, may be used for an actual route search from the starting point to the destination and for the route guidance based on the search result. The detailed description is omitted here (the same applies to the display control processing that will be described later).

When the route guidance from the starting point to the destination is started (Yes in SA1), the evaluation information acquisition unit 11 serially determines whether the driver's driving operation is fuel-efficient (for example, for each predetermined unit time or for each predetermined unit distance) and records the determination result in the RAM (not shown) (SA2). More specifically, when the eco lamp, which indicates whether or not the driver's driving operation is fuel-efficient, is configured to be displayed on the vehicle's meter panel (not shown), the evaluation information acquisition unit 11 acquires the eco lamp information, which identifies the eco lamp on/off status, from the ECU 2 and, based on the eco lamp information, determines the eco lamp on/off status for each predetermined time or for each predetermined distance. The evaluation information acquisition unit 11 records the determination result in the RAM. The eco lamp includes the eco lamp exemplified in FIG. 3A and the eco drive indicator lamp and the indicator exemplified in FIG. 3B.

Figure 3A:
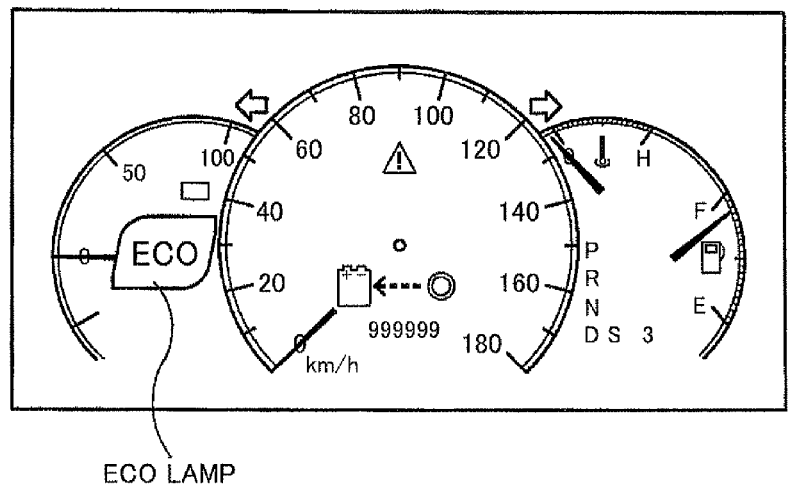
FIGS. 3A and 3B are diagrams showing an example of a meter panel on which the eco-lamp is displayed where
Figure 3B:
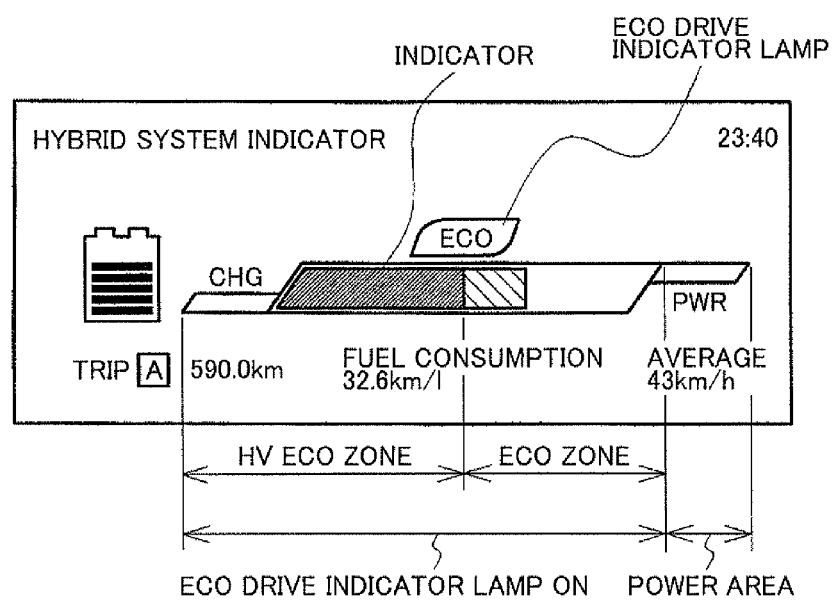

FIGS. 3A and 3B are diagrams showing an example of the meter panel on which the eco lamp and so on is displayed. FIG. 3A is a diagram showing an example of the meter panel of a gasoline-powered vehicle, and FIG. 3B is a diagram showing an example of the meter panel of a hybrid vehicle. For a gasoline-powered vehicle, if it is found, based on the information from the ECU2 such as the information on the accelerator opening degree, that the driver's driving operation is fuel efficient (for example, if the accelerator opening degree is equal to or lower than the threshold), the eco lamp is turned on as shown in FIG. 3A. On the other hand, if it is found that the driver's driving operation is not fuel efficient (for example, if the accelerator opening degree is larger than the threshold), the eco lamp is turned off. When the eco lamp is turned on or off in this way, the evaluation information acquisition unit 11 acquires the eco lamp information from the ECU 2 for use in identifying the on/off status of the eco lamp. Then, based on the acquired eco lamp information, the evaluation information acquisition unit 11 determines whether or not the eco lamp is turned on for each predetermined unit time or for each unit distance and records the determination result in the RAM.

For a hybrid vehicle, if it is found, based on the information from the ECU2 such as the information on the usage status of the power source, that the driver's driving operation is fuel efficient, the eco drive indicator lamp is turned on as shown in FIG. 3B. For example, if the regenerative brake is in operation or only the motor is used as the driving force (when the indicator is in "the HV eco zone" in FIG. 3B) or if the engine is also used as the driving force but the number of revolutions of the engine is equal to or lower than the threshold (when the indicator is in "the eco zone" in FIG. 3B), the eco drive indicator lamp is turned on. On the other hand, if it is found that the driver's driving operation is not fuel efficient, for example, if the engine is also used as the driving force and the number of revolutions of the engine is larger than the threshold (when the indicator is in "the power area" in FIG. 3B), the eco drive indicator lamp is turned off. When the eco drive indicator lamp and the indicator are turned on or off in this way, the evaluation information acquisition unit 11 acquires the eco lamp information from the ECU 2 for use in identifying the on/off status of the eco drive indicator lamp or the indicator. Then, based on the eco lamp information, the evaluation information acquisition unit 11 determines whether or not the eco drive indicator lamp is turned on and, if the eco drive indicator lamp is turned on, whether the indicator is in "the HV eco zone" or in "the eco zone", for each predetermined unit time or for each predetermined unit distance and records the determination result in the RAM.

Returning to FIG. 2, the evaluation information acquisition unit 11 determines, after the processing in SA2, whether the vehicle has traveled a unit interval (SA3). The unit interval means an interval having a predetermined distance. The predetermined distance may be a fixed value (for example, 100 m). Alternatively, the predetermined distance may be the distance of the vehicle's travel route divided into equal intervals, that is, the distance of the interval of a unit configuring the vehicle's travel route. For example, when the unit interval is a 100 m interval configuring the vehicle's travel route, the evaluation information acquisition unit 11 determines that the vehicle has traveled the unit interval when the vehicle has traveled 100 m after the processing of the immediately-preceding SA3 (or after route guidance is started in SA1 if the processing of SA3 is performed for the first time).

If it is found as a result of the determination that the vehicle has not yet traveled the unit interval (No in SA3), the evaluation information acquisition unit 11 returns control to SA2. Thereafter, the processing of SA2 and SA3 is repeated until it is determined that the vehicle has traveled the unit interval (Yes in SA3).

On the other hand, if it is found that the vehicle has traveled the unit interval (Yes in SA3), the evaluation information acquisition unit 11 acquires the determination result for the unit interval, which the vehicle has traveled, as the evaluation information (SA4).

For a gasoline-powered vehicle, the evaluation information acquisition unit 11 references the RAM and acquires the determination result, which indicates whether or not the eco lamp was turned on while the vehicle was traveling the unit interval, as the evaluation information. More specifically, the evaluation information acquisition unit 11 acquires, for example, two types of information as the evaluation information. One is the unit interval information identifying the distance of the unit interval that the vehicle traveled, and the other is the eco lamp turn-on information identifying the distance that the vehicle traveled in the unit interval with the eco lamp on.

For a hybrid vehicle, the evaluation information acquisition unit 11 references the RAM and acquires the determination result, which indicates whether or not the eco drive indicator lamp was turned on while the vehicle was traveling the unit interval and, if the eco drive indicator lamp was turned on, whether the indicator was in "the HV eco zone" or in "the eco zone", as the evaluation information. More specifically, the evaluation information acquisition unit 11 acquires, for example, three types of information as the evaluation information. One is the unit interval information identifying the distance of the unit interval that the vehicle traveled, the second is the eco drive indicator lamp turn-on information identifying the distance that the vehicle traveled in the unit interval with the eco drive indicator lamp on, and the third is the HV eco zone information identifying the distance that the vehicle traveled in the unit interval with the indicator in "the HV eco zone".

Next, the evaluation information acquisition unit 11 associates the evaluation information, acquired in SA4, with the unit interval information and stores the associated evaluation information in the evaluation information DB 22 (SA5). The unit interval information may be the coordinate information on the starting point and the end point of the unit interval that the vehicle traveled or the link number at which the unit interval is located.

After that, the evaluation information acquisition unit 11 determines whether or not the vehicle has arrived at the destination (SA6) and, if the vehicle has not yet arrived at the destination (No in SA6), control is passed back to SA2. Thereafter, the processing of SA2 to SA6 is repeated until the vehicle arrives at the destination. This repeated processing allows the evaluation information, which is an index for evaluating the vehicle driver's driving operation, to be acquired for each unit interval having the predetermined distance.

On the other hand, if the vehicle has arrived at the destination (Yes in SA6), the evaluation information acquisition unit 11 terminates the evaluation information acquisition processing. At this time, the evaluation information acquisition unit 11 stores the travel route information identifying the travel route along which the vehicle traveled, the date/time information identifying the date and time at which the evaluation information was acquired, and the final evaluation information identifying the final evaluation result for the travel from the starting point to the destination in the evaluation information DB 22 in association with the evaluation information, which was stored in the evaluation information DB 22 in SA5 before the vehicle arrived at the destination. The travel route information may be the coordinate information on the starting point and the destination.

Figure 4:
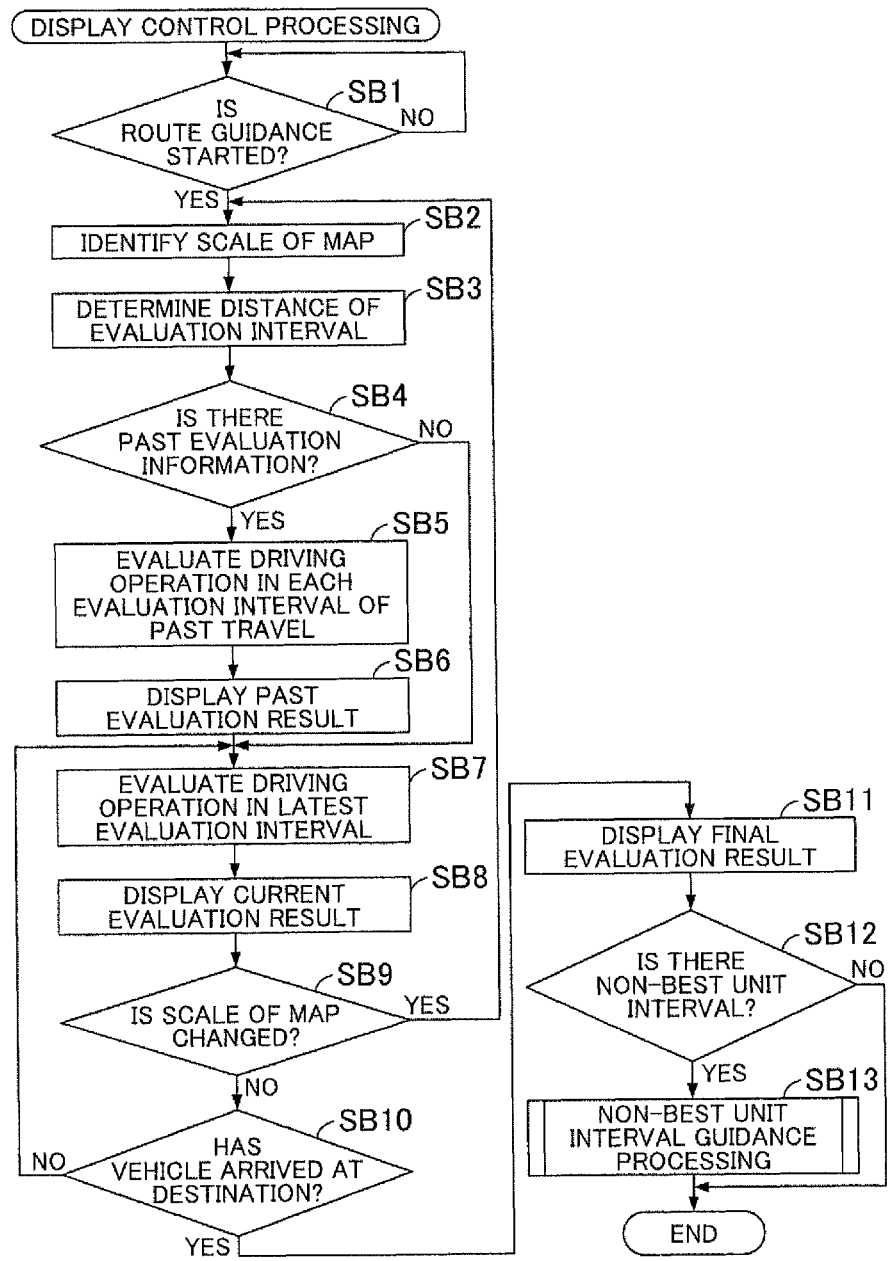
FIG. 4 is a flowchart showing the display control processing.

Next, the following describes the display control processing. FIG. 4 is a flowchart showing the display control processing. The display control processing is started, for example, when the navigation system 1 is turned on and the user performs the operation via the operation unit 4 to set the vehicle's travel destination. The display control processing is executed concurrently with the evaluation information acquisition processing described above.

When the display control processing is started, the evaluation unit 12 waits until the route guidance from the starting point (for example, the current position detected by the current position detection processing unit 3) to the destination is started (No in SB1).

When the route guidance from the starting point to the destination is started (Yes in SB1), the evaluation unit 12 identifies the scale of the map displayed on the display 5 (SB2). That is, the evaluation unit 12 identifies the scale of the map displayed on the display 5 for showing the route from the starting point to the destination.

Next, based on the scale of the map identified in SB2, the evaluation unit 12 determines the first distance of an evaluation interval for evaluating the driver's driving operation (SB3). For example, with the table indicating the correspondence between the scale of the map and the distance of the evaluation interval stored in the data recording unit 20 in advance, the evaluation unit 12 references the table to determine the first distance. More specifically, the first distance may be determined as 100 m when the scale of the map is $\frac{1}{10000}$, and 200 m when the scale of the map is $\frac{1}{20000}$. The first distance is determined in such a way that the smaller the scale of the map is, that is, the wider the display range of the map displayed on the display 5 is, the longer the first distance is.

Next, for the travel route from the starting point to the destination, the evaluation unit 12 determines if there is the past evaluation information that was stored in the evaluation information DB 22 during the evaluation information acquisition processing at a past travel time (SB4). For example, if the evaluation information, associated with the coordinate information on the starting point and the destination of the route for which the guidance is started in SB1 and a date/time earlier than the date/time of the route guidance started in SB1, is stored in the evaluation information DB 22, the evaluation unit 12 determines that there is the past evaluation information stored in the evaluation information DB 22.

If it is determined as a result of the determination that there is the past evaluation information stored in the evaluation information DB 22 (Yes in SB4), the evaluation unit 12 acquires the past evaluation information for each unit interval, included in each evaluation interval having the first distance, from the evaluation information DB 22. Then, based on the acquired past evaluation information, the evaluation unit 12 evaluates the driver's driving operation in the evaluation interval (SB5). If the vehicle traveled from the starting point to the destination two or more times in the past and the past evaluation information corresponding to each travel is stored in the evaluation information DB 22, the evaluation unit 12 acquires the evaluation information, acquired during the last travel from the starting point to the destination, from the evaluation information DB 22. The evaluation unit 12 may acquire the past evaluation information, acquired when the final evaluation result for the travel from the starting point to the destination is best, from the evaluation information DB 22. Alternatively, the evaluation unit 12 may also determine which past evaluation information is to be acquired from the evaluation information DB 22 based on an instruction received via the operation unit 4.

More specifically, the evaluation unit 12 divides the travel route from the starting point to the destination into evaluation intervals each having the first distance. And, based on the coordinate information on the starting point and the end point of each evaluation interval or based on the link number of a link positioned in the evaluation interval, the evaluation unit 12 identifies the unit intervals included in the evaluation interval and acquires the past evaluation information for each identified unit interval from the evaluation information DB 22. Based on the past evaluation information acquired in this way, the evaluation unit 12 finds an eco-travel ratio and, based on this eco-travel ratio, evaluates the driver's driving operation in each evaluation interval. The eco-travel ratio is a ratio of the vehicle travel distance, in which driver's driving operation was fuel efficient, in each evaluation interval.

For a gasoline-powered vehicle, the evaluation unit 12 finds an eco-travel ratio of the distance for which the vehicle traveled with the eco lamp turned on in each evaluation interval and, based on the eco-travel ratio, evaluates the driver's driving operation in each evaluation interval. More specifically, based on the evaluation information for each unit interval included in the evaluation interval, the evaluation unit 12 calculates the total distance for which the vehicle traveled in the evaluation interval with the eco lamp turned on. If the value calculated by dividing the total distance by the distance of the evaluation interval (that is, eco-travel ratio) is equal to or larger than the predetermined threshold (for example, 0.9), the evaluation unit 12 evaluates that the driver's driving operation in the evaluation interval is "good". Conversely, if the value is smaller than the predetermined threshold, the evaluation unit 12 evaluates that the driver's driving operation in the evaluation interval is "not good".

For a hybrid vehicle, the evaluation unit 12 finds two types of eco-travel ratio. One is a first eco-travel ratio of the distance for which the vehicle traveled with the eco drive indicator lamp turned on in the evaluation interval and the other is a second eco-travel ratio of the distance for which the vehicle traveled with the indicator in "the HV eco zone" in the evaluation interval. Based on the first and second eco ratios, the evaluation unit 12 evaluates the driver's driving operation in each evaluation interval.

Figure 5:
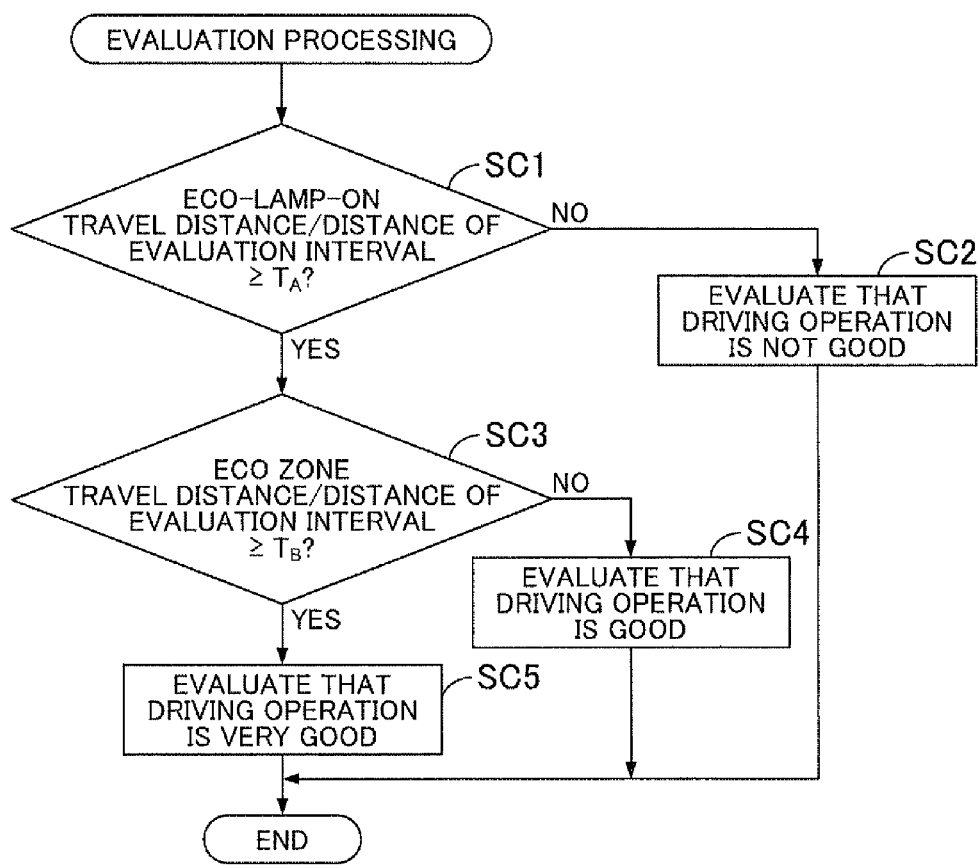
FIG. 5 is a flowchart showing the evaluation processing.

FIG. 5 is a flowchart showing the evaluation processing for a hybrid vehicle when the evaluation unit 12 evaluates the driver's driving operation in each evaluation interval. When the evaluation processing is started, the evaluation unit 12 performs the processing as shown in FIG. 5. That is, based on the evaluation information for each unit interval included in an evaluation interval, the evaluation unit 12 calculates the total distance (eco-lamp-on travel distance) for which the vehicle traveled with the eco drive indicator lamp tuned on in the evaluation interval. After that, the evaluation unit 12 determines if the value, generated by dividing the eco-lamp-on travel distance by the distance of the evaluation interval (that is, first eco-travel ratio), is equal to or larger than the predetermined threshold $T_A$ (for example, 0.9) (SC1).

If the value generated by dividing the eco-lamp-on travel distance by the distance of the evaluation interval is not equal to larger than the predetermined threshold $T_A$ (smaller than the threshold $T_A$) as the result of the determination (No in SC1), the evaluation unit 12 evaluates that the driver's driving operation in the evaluation interval is "not good" (SC2).

On the other hand, if the value generated by dividing the eco-lamp-on travel distance by the distance of the evaluation interval is equal to larger than the predetermined threshold $T_A$ (Yes in SC1), the evaluation unit 12 calculates the total distance (eco-zone travel distance), for which the vehicle traveled with the indicator in "the HV eco zone" in this evaluation interval, based on the evaluation information for each unit interval included in the evaluation interval. After that, the evaluation unit 12 determines if the value, generated by dividing the eco-zone travel distance by the distance of the evaluation interval (that is, second eco-travel ratio), is equal to or larger than the predetermined threshold $T_B$ (for example, 0.7) (SC3).

If the value generated by dividing the eco-zone travel distance by the distance of the evaluation interval is not equal to larger than the predetermined threshold $T_B$ (smaller than the threshold $T_B$) as the result of the determination (No in SC3), the evaluation unit 12 evaluates that the driver's driving operation in the evaluation interval is "good" (SC4).

On the other hand, if the value generated by dividing the eco-zone travel distance by the distance of the evaluation interval is equal to larger than the predetermined threshold $T_B$ (Yes in SC3), the evaluation unit 12 evaluates that the driver's driving operation in the evaluation interval is "very good" (SC5).

After the processing in SC2, SC4, or SC5, the evaluation unit 12 terminates the evaluation processing.

Figure 6:
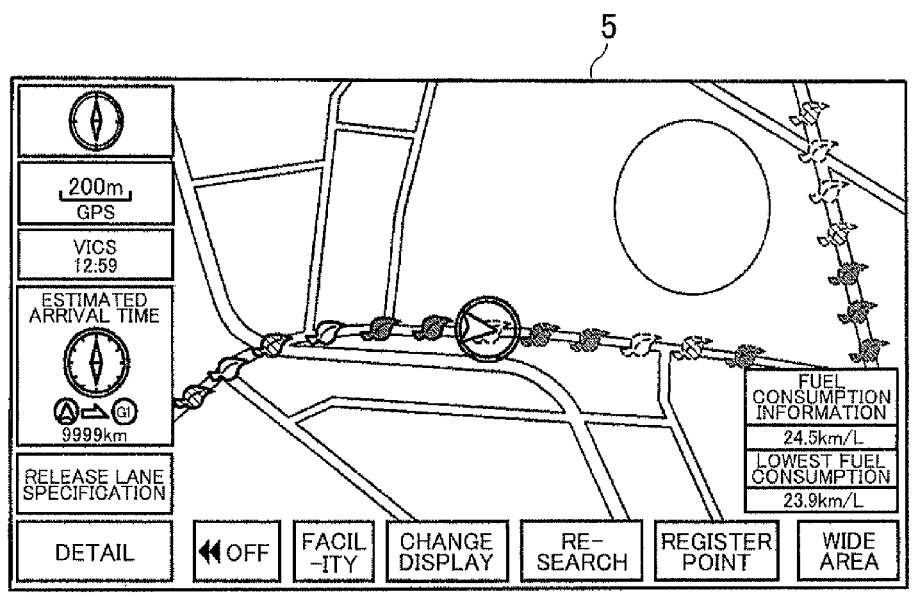
FIG. 6 is a diagram showing an example of the display on which the evaluation result of a driver's driving operation in each evaluation interval is displayed.

Returning to FIG. 4, the display control unit 13 performs the following processing after the processing in SB5. That is, the display control unit 13 controls the display of the past evaluation result so that the past evaluation result is displayed at the position corresponding to the evaluation interval on the map displayed on the display 5 (SB6). The past evaluation result is a evaluation result of the driver's driving operation in each evaluation interval, for the past travel from the starting point to the destination. FIG. 6 is a diagram showing an example of the display 5 on which the past evaluation result is displayed. As shown in FIG. 6, the display control unit 13 causes the display 5 to display a leaf-shaped mark, which indicates the past evaluation result, at the position corresponding to each evaluation interval. That is, leaf-shaped marks are displayed, one for each evaluation interval. A leaf-shaped mark has a color that varies according to the evaluation result in each evaluation interval (hatching shading in FIG. 6). In this case, to indicate that the past evaluation result is the evaluation result of the past travel, the display control unit 13 causes the display 5 to display the leaf-shaped mark semi-transparently (represented by dotted line in FIG. 6). In this way, because the distance of the evaluation interval is determined properly in SB3 based on the scale of the map, the leaf-shaped marks are displayed in an easy to view way with no overlapping between the neighboring leaf-shaped marks.

Returning to FIG. 4, either if it is determined in SB4 that there is no pat evaluation information stored in the evaluation information DB 22 (No in SB4), or after the processing in SB6, the evaluation unit 12 acquires the current evaluation information for the current travel, from the evaluation information DB 22. At this time, the evaluation unit 12 acquires the current evaluation information for each unit interval included in the latest evaluation interval having the first distance. Based on the acquired current evaluation information, the evaluation unit 12 evaluates the driver's driving operation in the latest evaluation interval (SB7). More specifically, the evaluation unit 12 acquires the current evaluation information, which has been stored in the evaluation information DB 22 during the evaluation information acquisition processing performed while the vehicle travels the distance of the evaluation interval after the previous processing in SB7 (or after the start of route guidance in SB1 when the processing in SB7 is performed for the first time), from the evaluation information DB 22. The evaluation unit 12 evaluates the driver's driving operation in the latest evaluation interval based on the acquired current evaluation information. The actual method for evaluating the driver's driving operation in the latest evaluation interval is the same as the method for evaluating the past travel described in SB5 in FIG. 4 and, therefore, the description is omitted here.

Next, the display control unit 13 performs control processing so that the current evaluation result is displayed at the position corresponding to the evaluation interval on the map displayed on the display 5 (SB8). The current evaluation result is a evaluation result of the driver's driving operation in the latest evaluation interval, for the current travel. The example in FIG. 6 shows that the display control unit 13 causes the display 5 to display a leaf-shaped mark, which indicates the current evaluation result, at the position corresponding to the evaluation interval. In this case, to indicate that the current evaluation result is the evaluation result of the current travel, the display control unit 13 causes the display 5 to display the leaf-shaped mark non-transparently (represented by solid line in FIG. 6). In this way, each time the vehicle travels in an evaluation interval in the current travel, the current evaluation result is sequentially superimposed on the leaf-shaped marks each indicating the past evaluation result. This display method allows the user to easily track both the past travel evaluation result and the current travel evaluation result at a time.

Returning to FIG. 4, the evaluation unit 12 checks whether the scale of the map, displayed on the display 5, is changed (SB9). If it is determined as the result of the checking that the scale of the map is changed (Yes in SB9), control is passed back to SB2 to identify the scale of the map displayed on the display 5 (SB2).

On the other hand, if the scale of the map displayed on the display 5 is not changed (No in SB9), the evaluation unit 12 checks whether the vehicle has arrived at the destination (SB10). If it is determined as the result of the checking that the vehicle has not yet arrived at the destination (No in SB10), control is passed back to SB7. That is, the evaluation unit 12 acquires the current evaluation information from the evaluation information DB 22 and, based on the acquired current evaluation information, evaluates the driver's driving operation in the latest evaluation interval (SB7). Thereafter, the evaluation unit 12 repeats the processing from SB7 to SB10 until the vehicle arrives at the destination. This repeated processing sequentially superimposes the current evaluation result of the driver's driving operation in each evaluation interval of the current travel on the leaf-shaped marks each indicating a past evaluation result.

If the vehicle has arrived at the destination (Yes in SB10), the evaluation unit 12 performs the final evaluation of the driver's driving operation in the current travel from the starting point to the destination. The display control unit 13 causes the display 5 to display the final evaluation result (SB11). For example, the evaluation unit 12 evaluates the driver's driving operation in all unit intervals of the vehicle's travel route in the current travel from the starting point to the destination based on the evaluation information on each of the unit intervals. Then, according to the best-evaluation ratio of the unit intervals, the evaluation unit 12 performs the final evaluation for the driver's driving operation in the current travel from the starting point to the destination. The best-evaluation ratio is ratio of the unit intervals, whose evaluation result is a best evaluation result, to all unit intervals of the travel route. The best evaluation result (for example, "good" for a gasoline-powered vehicle, and "very good" for a hybrid vehicle) corresponds to the best grade when the evaluation unit 12 evaluates the driver's driving operation with a plurality of grades. More specifically, the evaluation unit 12 may perform the final evaluation for the driver's driving operation in the current travel from the starting point to the destination as follows: "GOLD" when the evaluation results in all unit intervals, which constitute the travel route, are the best evaluation results, "SILVER" when the best-evaluation ratio is 70% or higher, and "BRONZE" when the best-evaluation ratio is lower than 70%. FIG. 7 is a diagram showing an example of the display 5 on which the final evaluation result is displayed. As shown in FIG. 7, the display control unit 13 causes the display 5 to display the final evaluation result ("GOLD" in FIG. 7) of the driver's driving operation in the current travel from the starting point to the destination based on the evaluation of the evaluation unit 12. In addition to the final evaluation result, the following are displayed on the display 5 in the example in FIG. 7: starting point ("home") and destination ("company") of the current travel, fuel consumption of the current travel from the starting point to the destination (24.5 km/L), fuel consumption of the previous travel from the starting point to the destination (23.5 km/L), and lowest fuel consumption in the past travels from the starting point to the destination (23.9 km/L).

Returning to FIG. 4, after the processing in SB11, the display control unit 13 checks whether or not the unit intervals, which constitute the vehicle's travel route, include at least one of unit intervals whose evaluation result is not the best evaluation result (hereinafter called "non-best unit interval" as necessary) (SB12). More specifically, the evaluation unit 12 evaluates the driver's driving operation in all unit intervals, which constitute the vehicle's travel route of the current travel from the starting point to the destination, based on the evaluation information for each of the unit intervals. As the result of the evaluation, if there is the unit intervals whose evaluation result is not the best evaluation result among the plurality of unit intervals which constitute the vehicle's travel route, the display control unit 13 determines that the vehicle's travel route includes the non-best unit interval.

If it is determined as the result of the evaluation that the vehicle's travel route does not includes the non-best unit interval (No in SB12), the control unit 10 terminates the display control processing.

On the other hand, if it is determined as the result of the evaluation that the vehicle's travel route includes the non-best unit interval (Yes in SB12), the display control unit 13 executes the non-best unit interval guidance processing (SB13). After that, the control unit 10 terminates the display control processing.

Figure 8:
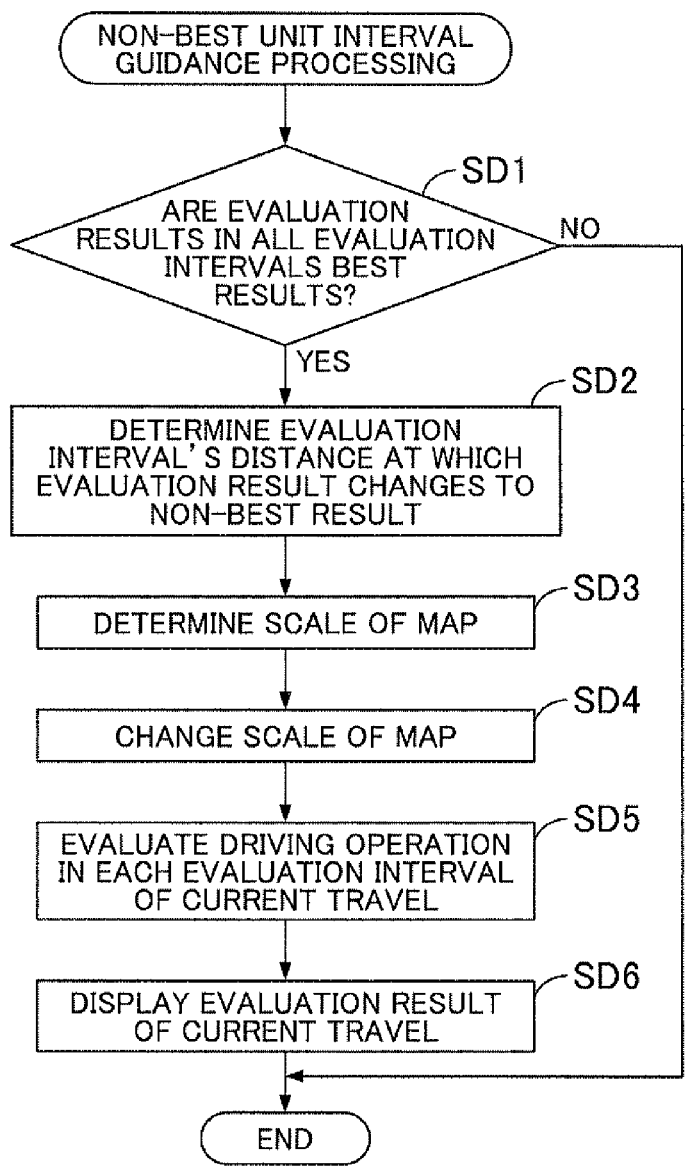
FIG. 8 is a flowchart showing the non-best unit interval guidance processing.

FIG. 8 is a flowchart showing the non-best unit interval guidance processing. As shown in FIG. 8, when the non-best unit interval guidance processing is started, the evaluation unit 12 determines whether or not the evaluation results in all evaluation intervals, which constitute the vehicle's travel route, are the best evaluation results (SD1). That is, the evaluation unit 12 checks whether or not the evaluation results in all evaluation intervals are the best evaluation results as the result of the evaluation of the driver's driving operation in the evaluation intervals of the current travel. This evaluation is performed in SB7 of the display control processing in FIG. 4.

If it is determined as the result of the checking that the evaluation results in all the evaluation intervals, which constitute the vehicle's travel route, are not the best evaluation results (No in SD1), the control unit 10 terminates the non-best unit interval guidance processing.

On the other hand, if it is determined as the result of the checking that the evaluation results in all evaluation intervals, which constitute the vehicle's travel route, are the best evaluation results (Yes in SD1), the display control unit 13 finds an evaluation interval which includes the non-best unit interval (hereinafter called "specific evaluation interval" as necessary) and finds a second distance of the specific evaluation interval, at which the evaluation result changes from the best evaluation result to a non-best evaluation result, by changing the distance of the specific evaluation interval from the first evaluation distance (SD2). The non-best evaluation result corresponds to grades other than the best grade when the evaluation unit 12 evaluates the driver's driving operation with a plurality of grades. So, the evaluation result by the evaluation unit 12 is one of the best evaluation result and the non-best evaluation result. More specifically, the display control unit 13 sets a distance, shorter than the first distance determined in SB3 in FIG. 4, as the distance of an evaluation interval and evaluates the driver's driving operation in the evaluation interval that has the set distance and that includes the non-best unit interval, in this way, the display control unit 13 evaluates the driver's driving operation in the specific evaluation intervals, which include the non-best unit interval, while making the distance of the evaluation interval shorter in stages (for example, the distance of an evaluation interval is shortened sequentially to 500 m, to 200 m, and then to 100 m). The display control unit 13 finds the second distance of the specific evaluation interval, at which the evaluation result changes from the best evaluation result to the non-best evaluation result.

Next, the display control unit 13 determines the scale of the map based on the second distance (SD3). For example, the display control unit 13 references the table, which indicates the correspondence between the scale of the map and the distance of the evaluation interval, to determine the scale of the map corresponding to the second distance. More specifically, the display control unit 13 may determine the scale as $\frac{1}{10000}$ when the second distance is 100 m, and as $\frac{1}{20000}$ when the second distance is 200 m.

Next, the display control unit 13 changes the scale of the map, displayed on the display 5, to the scale determined by the display control unit 13 in SD3 (SD4).

After that, the display control unit 13 acquires the current evaluation information for each unit interval, included in each evaluation interval having the second distance, from the evaluation information DB 22 for the current travel and, based on the acquired current evaluation information, evaluates the driver's driving operation in each evaluation interval (SD5). More specifically, the display control unit 13 acquires the current evaluation information stored in the evaluation information DB 22 during the evaluation information acquisition processing that was performed while the vehicle traveled to the destination in the current travel. And, based on the acquired current evaluation information, the display control unit 13 evaluates the driver's driving operation in each evaluation interval. The actual method for evaluating the driver's driving operation in each evaluation interval is the same as the method for evaluating the past travel described in SB5 in FIG. 4 and, therefore, the description is omitted here.

Next, the display control unit 13 performs control so that the current evaluation result in each evaluation interval, which has the second distance, is displayed at the position corresponding to the evaluation interval on the map displayed on the display 5 (SD6). Because the evaluation result in the evaluation interval which includes a non-best unit interval is not best evaluation result, the leaf-shaped mark corresponding to a non-best evaluation result is displayed on the display 5. This leaf-shaped mark, when displayed, gives guidance to the user that the evaluation interval includes a non-best unit interval.

After the processing in SD6, the control unit 10 terminates the non-best unit interval guidance processing and returns control to the main routine.

In this embodiment, the evaluation unit 12 determines the first distance of the evaluation interval, which is an interval for evaluating the driver's driving operation, based on the first scale of the map displayed on the display 5 as described above. In addition, the evaluation unit 12 evaluates the driver's driving operation in each evaluation interval having the first distance, based on the evaluation information for each unit interval included in the evaluation interval. The display control unit 13 performs control so that the evaluation result by the evaluation unit 12 is displayed at the position corresponding to the evaluation interval, on the map displayed on the display 5. This control therefore allows the evaluation results, which are displayed on the display 5, to be properly spaced to each other according to the scale of the map, thus allowing the evaluation result of the driver's driving operation to be displayed on the map in an easy to view format.

If the evaluation results in all evaluation intervals that constitute the travel route of the vehicle are the best evaluation results but if the travel route includes the non-best unit interval whose the evaluation result is non-best evaluation result, the display control unit 13 performs control to provide the guidance on the non-best unit interval. This means that, even if the evaluation results in all evaluation intervals are best evaluation results depending upon the distance of the evaluation interval, the display control unit 13 allows the user to identify a unit interval whose evaluation result is not the best evaluation result, thus notifying the user of an interval in which the user can improve the driving operation.

If the evaluation results in all evaluation intervals that constitute the travel route of the vehicle are the best evaluation results but if the travel route includes the non-best unit interval whose the evaluation result is non-best evaluation result, the display control unit 13 finds the second distance of the specific evaluation interval that includes the non-best unit interval, at which the evaluation result in the specific evaluation interval changes from the best evaluation result to the no-best evaluation result. In addition, the display control unit 13 determines the second scale of the map based on the second distance and changes the scale of the map, displayed on the display 5, from the first scale to the second scale. After that, the display control unit 13 performs the control to provide the guidance on the non-best unit interval, on the map of the second scale. The display control unit 13 therefore allows the user to identify an evaluation interval that includes a unit interval whose evaluation result is not best evaluation result, enabling the user to easily identify an interval in which the driving operation can be improved.

The evaluation information acquisition unit 11 serially determines whether or not the driver's driving operation is fuel efficient and, for each unit interval, acquires the determination result of the unit interval as the evaluation information. Based on the evaluation information on the unit intervals included in the evaluation interval, the evaluation unit 12 identifies a ratio of the vehicle's travel distance, for which the driver's driving operation in each of the evaluation intervals is fuel efficient, and evaluates the driver's driving operation in each evaluation interval based on the ratio. Therefore, it is possible to properly determine whether or not the driver's driving operation is fuel efficient in each evaluation interval according to the ratio at which the driver performs fuel-efficient driving operation in the evaluation interval.

While the embodiment of the present invention has been described, the actual configuration and the units of the present invention may be altered or improved in the scope of the technological concept of the inventions described in the claims. The following describes modifications.

First, it should be noted that the problems to be solved by the present invention and the effect of the present invention are not limited by the contents described above but may be varied according to the implementation environment of the present invention or the details of the configuration. Therefore, the present invention may solve only a part of the problems described above or archive only a part of the effects described above.

The electrical components described above, conceptually functional components, need not always be configured physically as shown in the figures. That is, the actual mode of the distribution and integration of the components is not limited to the mode shown in the figure. Instead, the components may be functionally or physically distributed or integrated, in part or in whole, in any units according to the various types of load and the usage status. For example, the navigation system 1 may be mounted on a vehicle as one integrated device. The navigation system 1 may also be provided, in part or in whole (for example, the evaluation unit 12 of the control unit 10, or evaluation information DB 22 of the data recording unit 20), in a center device connected to a vehicle over a network in such a way that they can communicate with each other.

In the example used in the description of the embodiment described above, the evaluation information acquisition unit 11 performs the following in SA2 in the evaluation information acquisition processing shown in FIG. 2. That is, the evaluation information acquisition unit 11 acquires eco-lamp information, which identifies the eco-lamp on/off status, from the ECU 2 and, based on the eco-lamp information, serially determines the eco-lamp on/off status. Instead of this method, the evaluation information acquisition unit 11 may also acquire the information, which identifies the accelerator opening degree, brake pedal force, power source usage status, etc., directly from the ECU 2 and, based on the acquired information, serially determines whether or not the driver's driving operation is fuel efficient.

In the example in the embodiment described above, the evaluation unit 12 calculates the total distance, for which the vehicle traveled in the evaluation interval with the eco-lamp turned on or with the indicator in "the HV eco-zone", in SB5 of the display control processing shown in FIG. 4. After that, based on whether the value, generated by dividing the total distance by the distance of the evaluation interval, is equal to or larger than the predetermined threshold, the evaluation unit 12 evaluates the driver's driving operation in the evaluation interval. Here, the predetermined threshold may be changed according to the driver's level. For example, the predetermined threshold may be set to 0.7 for a driver at the beginner's level, 0.8 for a driver at the intermediate level, and 0.9 for a driver at the advanced level. In this case, the driver's level may be determined according to the final evaluation of the driver's driving operation in SB11 of the display control processing. For example, when the final evaluation of the driver's driving operation is "GOLD" in two consecutive travels, the driver's level may be increased to the next higher level.

What is claimed is:

1. A navigation system comprising:
   an evaluation information acquisition unit that acquires evaluation information for each map unit interval having a predetermined distance, the evaluation information being an index for evaluating a driver's driving operation of a vehicle, the index including a plurality of grades for evaluating the driver's operation of the vehicle;
   a data recording unit that stores a table indicating a correspondence between map scales and respective evaluation interval distances so that the smaller the map scale, the wider the display area of a map, and the longer the corresponding evaluation interval distance, every evaluation interval distance in the table being equal to or longer than the predetermined distance of the map unit intervals;
   an evaluation unit that:
      determines, based on a first scale of the map displayed on a display unit and the stored table, a first distance of an evaluation interval for evaluating the driver's driving operation; and
      evaluates the driver's driving operation in the evaluation interval having the first distance based on the evaluation information for each map unit interval included in the evaluation interval, the evaluation unit evaluating the driver's operation as best when the driver operates the vehicle according to a highest grade of the plurality of grades in the index and evaluating the driver's operation as non-best when the driver operates the vehicle according to a grade other than the highest grade of the plurality of grades in the index; and
   a display control unit that performs control so that an evaluation result by the evaluation unit is displayed at a position corresponding to the evaluation interval on the map displayed on the display unit.

2. The navigation system according to claim 1, wherein:
   the evaluation unit evaluates the driver's driving operation in each unit interval based on the evaluation information for each unit interval; and
   if the evaluation results in all evaluation intervals that constitute a travel route of the vehicle are the best evaluation results and the travel route includes a non-best map unit interval whose evaluation result is a non-best evaluation result, the display control unit performs control to provide a guidance on the non-best map unit interval.

3. The navigation system according to claim 2, wherein when the evaluation results in the all evaluation intervals are the best evaluation results and the travel route includes the non-best map unit interval, the display control unit:
   finds a second distance of a specific evaluation interval that includes the non-best map unit interval, at which the evaluation result in the specific evaluation interval changes from the best evaluation result to the non-best evaluation result;
   determines a second scale of the map based on the second distance,
   changes the scale of the map, displayed on the display unit, from the first scale to the second scale; and
   performs the control to provide the guidance on the non-best map unit interval, on the map of the second scale.

4. The navigation system according to claim 1, wherein:
   the evaluation information acquisition unit serially determines whether or not the driver's driving operation is fuel efficient and, for each unit interval, acquires a determination result in the unit interval as the evaluation information; and
   based on the evaluation information on the unit intervals included in the evaluation interval, the evaluation unit identifies a ratio of the vehicle's travel distance, for which the driver's driving operation in each of the evaluation intervals is fuel efficient, and evaluates the driver's driving operation in each evaluation interval based on the ratio.

5. A navigation method comprising:
   acquiring, with a CPU, evaluation information for each map unit interval having a predetermined distance, the evaluation information being an index for evaluating a driver's driving operation of a vehicle, the index including a plurality of grades for evaluating the driver's operation of the vehicle;
   accessing, with the CPU, a data recording unit that stores a table indicating a correspondence between map scales and respective evaluation interval distances so that the smaller the map scale, the wider the display area of a map, and the longer the corresponding evaluation interval distance, every evaluation interval distance in the table being equal to or longer than the predetermined distance of the map unit intervals;
   determining, with the CPU, based on a first scale of the map displayed on a display unit and the stored table, a first distance of an evaluation interval for evaluating the driver's driving operation;
   evaluating, with the CPU, the driver's driving operation in the evaluation interval having the first distance based on the evaluation information for each map unit interval included in the evaluation interval, the evaluation unit evaluating the driver's operation as best when the driver operates the vehicle according to a highest grade of the plurality of grades in the index and evaluating the driver's operation as non-best when the driver operates the vehicle according to a grade other than the highest grade of the plurality of grades in the index; and
   performing, with the CPU, control so that an evaluation result of the driver's driving operation is displayed at a position corresponding to the evaluation interval on the map displayed on the display unit.

6. A non-transitory computer-readable storage medium that stores a computer-executable navigation program, the program comprising instructions for:
   acquiring evaluation information for each map unit interval having a predetermined distance, the evaluation information being an index for evaluating a driver's driving operation of a vehicle, the index including a plurality of grades for evaluating the driver's operation of the vehicle;
   accessing, with the CPU, a data recording unit that stores a table indicating a correspondence between map scales and respective evaluation interval distances so that the smaller the map scale, the wider the display area of a map, and the longer the corresponding evaluation interval distance, every evaluation interval distance in the table being equal to or longer than the predetermined distance of the map unit intervals;

determining based on a first scale of the map displayed on a display unit and the stored table, a first distance of an evaluation interval for evaluating the driver's driving operation;

evaluating the driver's driving operation in the evaluation interval having the first distance based on the evaluation information for each map unit interval included in the evaluation interval, the evaluation unit evaluating the driver's operation as best when the driver operates the vehicle according to a highest grade of the plurality of grades in the index and evaluating the driver's operation as non-best when the driver operates the vehicle according to a grade other than the highest grade of the plurality of grades in the index; and performing control so that an evaluation result of the driver's driving operation is displayed at a position corresponding to the evaluation interval on the map displayed on the display unit.

* * * * *